United States Patent [19]

Bonis

[11] 4,391,863
[45] Jul. 5, 1983

[54] PEEL RESISTANT COEXTRUDED SHEET

[75] Inventor: Laszlo J. Bonis, Swampscott, Mass.

[73] Assignee: Composite Container Corporation, Medford, Mass.

[21] Appl. No.: 314,120

[22] Filed: Oct. 23, 1981

[51] Int. Cl.³ .............................................. B65D 1/34
[52] U.S. Cl. ..................... 428/35; 428/516; 428/517; 428/519; 428/520; 264/515; 206/557; 220/405; 220/415; 220/DIG. 14
[58] Field of Search ................ 428/35, 516, 517, 520, 428/519; 264/515

[56] References Cited

U.S. PATENT DOCUMENTS

| | | | |
|---|---|---|---|
| 3,281,383 | 10/1966 | Zellinski et al. | 260/23.7 |
| 3,639,521 | 2/1972 | Hsieh | 260/880 |
| 4,123,576 | 10/1978 | Kobayashi et al. | 428/35 |
| 4,230,761 | 10/1980 | Watts | 428/517 |
| 4,234,663 | 11/1980 | Catte et al. | 428/517 |

FOREIGN PATENT DOCUMENTS 51-55382  5/1976  Japan ................................. 428/517

*Primary Examiner*—P. Ives

[57] ABSTRACT

A coextruded thermoplastic sheet, with high peel strength and suitable for thermoforming into a container, the sheet including a layer of acrylonitrile-methyl acrylate copolymer to act as a gas barrier and provide rigidity, thermoformability and printability, a structural layer of polyolefin to provide a moisture barrier and chemical resistance, and an intermediate tie layer of a radial butadiene/styrene teleblock copolymer to provide a strong bond between the acrylonitrile-methyl acrylate copolymer and polyolefin notwithstanding the differences in tendencies to shrink between the two materials.

11 Claims, 3 Drawing Figures

PEEL RESISTANT COEXTRUDED SHEET

FIELD OF THE INVENTION

The invention relates to coextruded sheets and containers formed therefrom.

BACKGROUND OF THE INVENTION

It is desirable to make a multilayered sheet from layers of acrylonitrile-methyl acrylate copolymer and an olefin, because these materials have complimentary properties. For example, acrylonitrile-methyl acrylate copolymer has excellent gas barrier properties, clarity, a glossy appearance after thermoforming, and rigidity, provides easy thermoformability to a multilayered coextruded sheet including it, and can be printed on; however, it does not have a substantial moisture barrier, high heat tolerance, or as high a degree of chemical resistance as some other materials, and it does not have Food & Drug Administration (FDA) approval for use in contacting foods. Polypropylene, on the other hand, has moisture barrier properties, chemical resistance, a higher heat tolerance, and FDA approval for contact with food; however, it is extremely difficult to thermoform; there is no gas barrier, and it is difficult to achieve a glossy appearance with it after thermoforming. There is a difference in the tendency to shrink between the acrylonitrile-methyl acrylate copolymer and the polypropylene, and this difference in shrinkage tends to cause delamination of sheets having layers of both these materials with time.

SUMMARY OF THE INVENTION

It has been discovered that using a radial butadiene/styrene teleblock copolymer having between 60 and 80% butadiene and between 20 and 40% styrene as an intermediate tie layer coextruded between an acrylonitrile-methyl acrylate copolymer layer and an polyolefin structural layer provides very high peel strength (i.e., resistance to peeling of the coextruded layers) which increases with time.

In preferred embodiments the radial butadiene/styrene teleblock copolymer has a butadiene/styrene ratio of about 70/30, less than about 0.4% volatile matter, an average molecular weight of about 140 M, a specific gravity of about 0.94, a melt flow of about 2 1 decigrams/min under a 5 kg load at 200° C., a tensile strength of about 2600 psi at room temperature, an elongation of about 700%, a 300% modulus of about 400 psi, and a Shore A hardness of 65 when compression molded; the polyolefin is polypropylene or polyethylene; and the sheet is thermoformed into the shape of a container with the structural layer on the interior so that the container can be used to package food.

DESCRIPTION OF THE PREFERRED EMBODIMENT

The structure and manufacture of the presently preferred embodiment will now be described after first briefly describing the drawings.

Drawings

STRUCTURE

Figure 1:
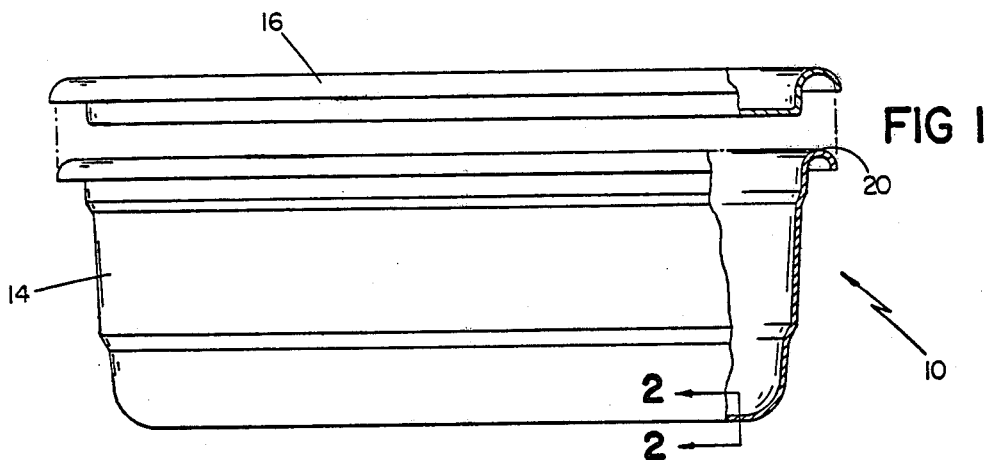
FIG. 1 is a partially cross-sectional elevation of the container according to the invention with the lid shown raised above its installed position.
Figure 3:
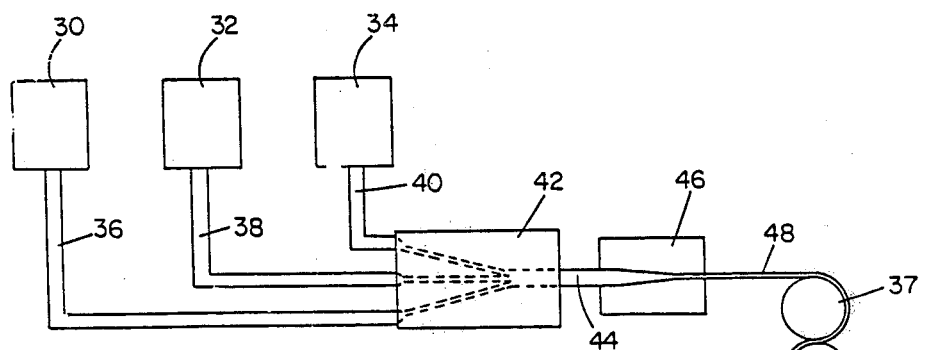
FIG. 3 is a diagrammatic view of the manufacturing process for forming the container.
Figure 3:
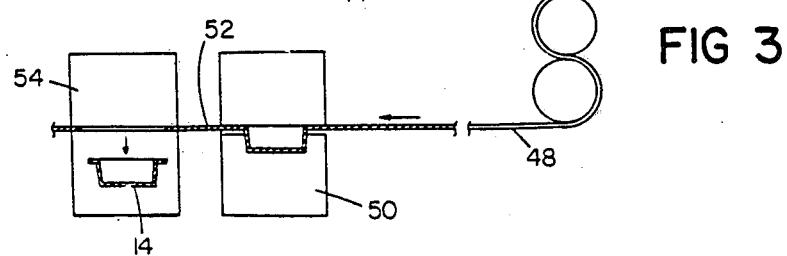

Referring to FIG. 1, there is shown container 10 consisting of bowl 14 and lid 16. Both the lid and bowl are made from multilayered sheets that are formed by coextrusion. Bowl 14 is thermoformed from such a sheet as depicted in FIG. 3, and lid 16 is cut from a similar sheet and heat sealed to rim 20 of bowl 14.

Figure 2:
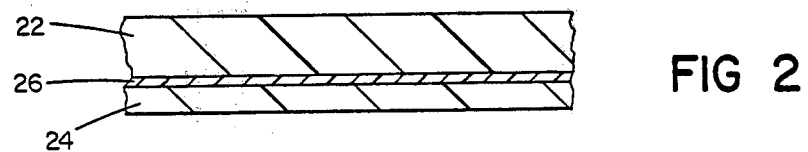
FIG. 2 is a cross-sectional view, at 2—2 of FIG. 1, showing the multilayered construction of the container walls.

As shown in FIG. 2, the finished bowl and lid have three layers; inner 16 mil thick polyolefin structural layer 22 of polypropylene (available from Rexene Co., Paramus, New Jersey and having a melt flow index of 4 decigrams/min and a $H_2O$ permeability at 100° F., 90% humidity below 1.0 gm/mil/100 $in^2$-24 hr-atm), three mil thick outer gas barrier layer 24 of acrylonitrile-methyl acrylate copolymer (available under the trade designation Barex 210 from Vistron Corporation and having an $O_2$ permeability at 73° F. of 0.8 cc/mil/100 $in^2$-24 hr-atm; an $H_2O$ permeability at 100° F., 90% humidity of 5.0 gm/mil/100 $in^2$-24 hr-atm; a melt flow index of between 3 and 12 decigrams/min; and a tensile modulus of $0.27 \times 10^4$ $kg/cm^2$), and one mil thick intermediate tie layer 26 of a radial butadiene/styrene teleblock copolymer (a rubber modifying plastomer available under the trade designation Solprene 416P from Phillips Chemical Company and having a butadiene/styrene ratio of about 70/30, less than about 0.4% volatile matter, an average molecular weight of about 140 M, a specific gravity of about 0.94, a melt flow of about 2 decigrams/min under a 5 kg load at 200° C., a tensile strength of about 2600 psi at room temperature, an elongation of about 700%, a 300% modulus of about 400 psi, and a Shore A hardness of 65 when compression molded.) Methods of making the radial butadiene/styrene teleblock copolymer are described in U.S. Pat. Nos. 3,281,383 and 3,639,521, which are hereby incorporated by reference.

Polyolefin structure layer 22 is on the interior of container 10 so that it, and not the acrylonitrile-methyl acrylate copolymer in layer 24, which is not FDA approved for food contact, contacts the food packaged therein. Acrylonitrile-methyl acrylate copolymer layer 24 acts as a gas barrier and provides thermoformability during manufacture and rigidity to bowl 14 and lid 16. It also allows for printing directly on the outer surface of container 10. Polypropylene layer 22 provides a moisture barrier layer and chemical resistance to container 10. Gas barrier layer 24 and structural layer 22 are tightly bonded to each other by tie layer 26, notwithstanding the fact that the materials of layers 24 and 26 have differences in their tendencies to shrink, and the peel strength of the coextruded sheet has been found to increase with time.

MANUFACTURE

Turning to FIG. 3, the coextrusion process for forming the three layer sheet material is shown. Three heated containers 30, 32, 34 serve as sources of the polypropylene, tie layer material, and acrylonitrile-methyl acrylate copolymer, respectively. The polypropylene is heated in container 30 to approximately 400° F. The acrylonitrile-methyl acrylate copolymer is heated in container 34 to about 360° F. The tie layer material is heated in container 32 to about 350° F.

Three conduits 36, 38, 40 supply the heated materials to coextrusion block 42. There the materials merge together to form under pressure a unitary, three-layer thick stream 44 of generally circular cross section. Stream 44 passes into extrusion die 46 (e.g., Welex standard 54" flex-lip die), while maintained at a temperature between 400° and 420° F., for extrusion into continuous sheet 48 about 40 mils thick (polypropylene layer 32 mils; tie layer 2 mils; and acrylonitrile-methyl acrylate copolymer layer 3 mils). Sheet 48 then passes through a series of chill rolls 37. This method uses a single coextrusion step to economically and reliably provide a sheet with high quality bonds between the two outer materials having complimentary properties but different tendencies to shrink.

The sheet, after coextrusion, may then be processed into containers or wound into spools (not shown) for storage.

To process sheet 48 into containers, the sheet is passed through conventional thermoforming apparatus 50 (the vacuum forming type well known in the art), which impresses the bowl shape and in doing so reduces the wall thickness by about 50% on the average, making the finished container wall about 20 mils thick. The individual layer thicknesses are also each reduced by about 50% during thermoforming.

After thermoforming, the shaped sheet 52 passes through trim press 54, in which the individual bowls 14 for the containers are separated. Thereafter, each bowl is given curled rim 20 (FIG. 1) by a conventional curling machine (not shown).

Lids 16 are separately cut from sheet 48 and heat-sealed to curled rim 20 by conventional heat-sealing techniques.

OTHER EMBODIMENTS

Other embodiments of the invention are within the scope of the appended claims. For example, other polyolefins such as polyethylene or filled polypropylene can be used for structural layer 22, and the butadiene/styrene ratio of the teleblock copolymer can be varied between 80/20 and 60/40.

What is claimed is:

1. A coextruded sheet comprising
   a layer made of acrylonitrile-methyl acrylate copolymer to provide a gas barrier, rigidity, thermoformability, and printability,
   a structural layer made of polyolefin to provide a moisture barrier and chemical resistance, and
   an intermediate tie layer made of a radial butadiene/styrene teleblock copolymer having between 60 and 80% butadiene and between 20 and 40% styrene, whereby said tie layer provides a strong bond between said acrylonitrile methyl-acrylate layer and said polyolefin layer notwithstanding the difference in shrinkage between said acrylonitrile methyl-acrylate layer and said polyolefin layer.

2. The sheet of claim 1 wherein said radial butadiene/styrene teleblock copolymer has a butadiene/styrene ratio of about 70/30.

3. The sheet of claim 2 wherein said radial teleblock copolymer has less than about 0.4% volatile matter, an average molecular weight of about 140 M, a specific gravity of about 0.94, a melt flow of about 2 decigrams/min under a 5 kg load at 200° C., a tensile strength of about 2600 psi at room temperature, an elongation of about 700%, a 300% modulus of about 400 psi, and a Shore A hardness of about 65 when compression molded.

4. The sheet of claim 2 wherein said polyolefin is polypropylene.

5. The sheet of claim 2 wherein said polyolefin is polyethylene.

6. A container thermoformed from a coextruded sheet, said container comprising
   a layer made of acrylonitrile-methyl acrylate copolymer to provide a gas barrier, rigidity, thermoformability, and printability,
   a structural layer made of polyolefin to provide a moisture barrier and chemical resistance, and
   an intermediate tie layer made of a radial butadiene/styrene teleblock copolymer having between 60 and 80% butadiene and between 20 and 40% styrene whereby said tie layer provides a strong bond between said acrylonitrile methyl-acrylate layer and said polyolefin layer notwithstanding the difference in shrinkage between said acrylonitrile methyl-acrylate layer and said polyolefin layer.

7. The container of claim 6 wherein said radial butadiene/styrene teleblock copolymer has a butadiene/styrene ratio of about 70/30.

8. The container of claim 7 wherein said radial teleblock copolymer has less than about 0.4% volatile matter, an average molecular weight of about 140 M, a specific gravity of about 0.94, a melt flow of about 2 decigrams/min under a 5 kg load at 200° C., a tensile strength of about 2600 psi at room temperature, an elongation of about 700%, a 300% modulus of about 400 psi, and a Shore A hardness of about 65 when compression molded.

9. The container of claim 7 wherein said polyolefin is polypropylene.

10. The container of claim 7 wherein said polyolefin is polyethylene.

11. The container of claim 6 or 7 wherein said structural layer is placed on the interior of said container, so that said acrylonitrile-methyl acrylate copolymer layer will not contact the contents, whereby said container can be used to package food.

* * * * *